(12) United States Patent
Kockmann

(10) Patent No.: US 6,856,797 B2
(45) Date of Patent: Feb. 15, 2005

(54) PROGRAMMABLE RADIO RECEIVER BANDPASS FILTER FOR CORDLESS/WIRELESS SYSTEMS

(75) Inventor: Juergen Kockmann, Duesseldorf (DE)

(73) Assignee: Siemens Communications, Inc., Boca Raton, FL (US)

(*) Notice: Subject to any disclaimer, the term of this patent is extended or adjusted under 35 U.S.C. 154(b) by 469 days.

(21) Appl. No.: 09/752,623

(22) Filed: Dec. 28, 2000

(65) Prior Publication Data

US 2002/0086686 A1 Jul. 4, 2002

(51) Int. Cl.⁷ ............................... H04B 1/16; H04B 1/06
(52) U.S. Cl. .................. 455/339; 455/180.1; 455/213; 455/266; 375/137; 375/152
(58) Field of Search ............... 455/150.1, 168.1, 455/176.1, 180.1, 188.1, 213, 266, 339, 517, 561, 550.1, 462, 463, 464, 74.1, 151.1, 154.1; 375/136, 152, 132, 147

(56) References Cited

U.S. PATENT DOCUMENTS

| | | | | |
|---|---|---|---|---|
| 3,938,048 A | * | 2/1976 | Elliott | 455/158.3 |
| 4,479,226 A | * | 10/1984 | Prabhu et al. | 380/34 |
| 5,790,587 A | * | 8/1998 | Smith et al. | 375/147 |
| 5,982,762 A | * | 11/1999 | Anzai et al. | 370/338 |
| 6,128,504 A | * | 10/2000 | Ciccone | 455/464 |
| 6,263,210 B1 | * | 7/2001 | Takahashi | 455/464 |
| 6,272,353 B1 | * | 8/2001 | Dicker et al. | 455/517 |
| 6,278,722 B1 | * | 8/2001 | Evans | 375/133 |
| 6,480,721 B1 | * | 11/2002 | Sydon et al. | 455/464 |
| 6,584,304 B1 | * | 6/2003 | Thomsen et al. | 455/188.1 |

\* cited by examiner

*Primary Examiner*—Simon Nguyen

(57) ABSTRACT

A programmable band-pass filter in a radio-frequency receiver. The band-pass filter has a bandwidth substantially covering a channel bandwidth. Once the appropriate channel in use is determined, the frequency band of the band-width filter is set to correspond to it.

16 Claims, 3 Drawing Sheets

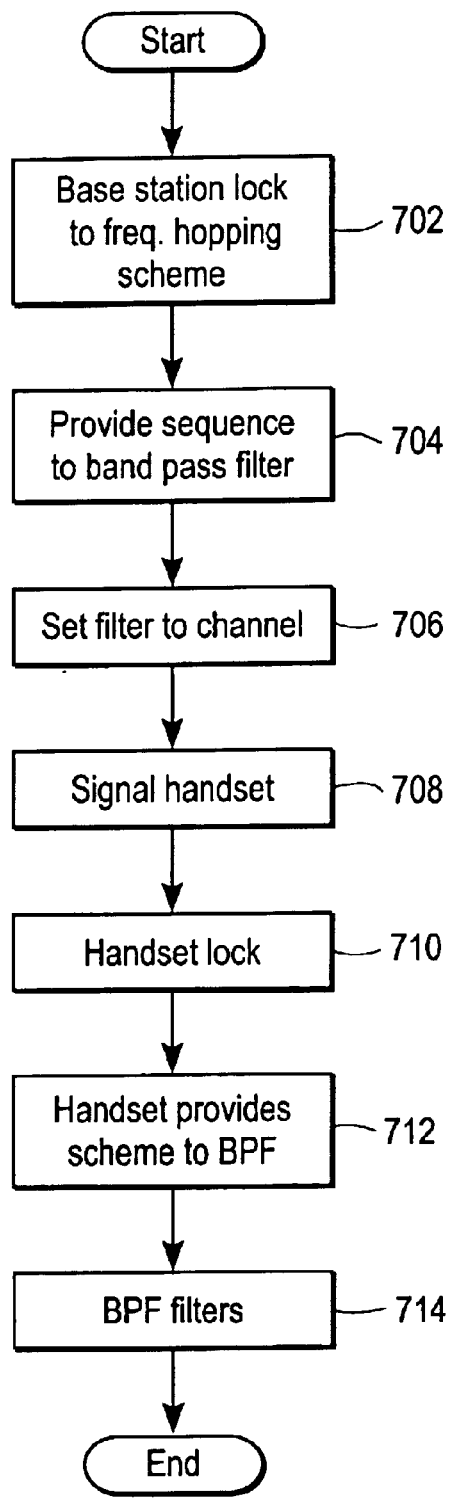
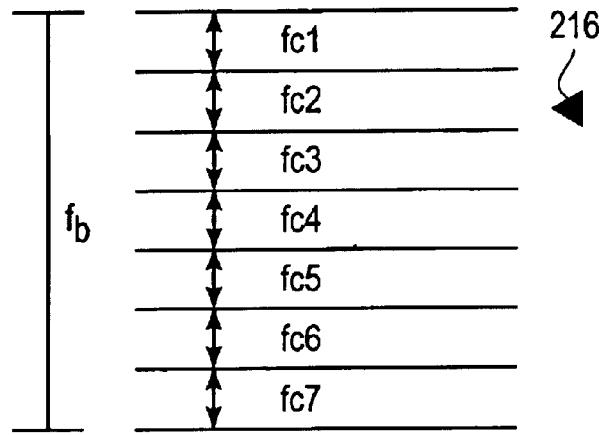
FIG. 3
FIG. 7

PROGRAMMABLE RADIO RECEIVER BANDPASS FILTER FOR CORDLESS/WIRELESS SYSTEMS

BACKGROUND OF THE INVENTION

1. Field of the Invention

The present invention relates to telecommunication systems and, particularly, to a system that is more robust against in-band interferers.

2. Description of the Related Art

In conventional radio-frequency (RF) receivers, a band-pass filter is used to filter out-of-band interferers. In many cordless and/or wireless systems, the available bandwidth is subdivided into smaller channels. However, the band-pass filter typically has a bandwidth covering the entire available bandwidth.

Such a receiver is illustrated more particularly in FIG. 1. The system 100 includes an antenna 101, a band-pass filter 102, a mixer 104, a voltage-controlled oscillator 106, a band-pass filter 108, a demodulator 110, a low-pass filter 112, and a synchronization block 114.

A modulated signal is received at the antenna 101 and is band-pass filtered by the band-pass filter 102. The band-pass filter 102 reduces the receiving signal bandwidth to the bandwidth that covers all the used channels. By doing so, the band-pass filter 102 filters out the out-of-band interference. The signal output from the band-pass filter 102 is mixed in the mixer 104 with a lower constant frequency signal which may be generated, as shown, by the voltage controlled oscillator 106. The modulated receive signal is thus transferred down to a lower frequency, typically referred to as the Intermediate Frequency (IF). The band-pass filter 108 is provided behind the mixer 104 because the output of the mixer 104 is two down-converted modulated receive signals on two different frequencies, only one of which can be used in the demodulator 110. Thus, only one of the down-converted IF signals is passed through the band-pass filter 108 to the demodulator 112. The demodulator 110 converts the frequency-modulated signal into a baseband signal, which is low-pass filtered using the low-pass filter 112. Finally, the sync block 114 synchronizes to the low-pass filtered signal. For example, the synchronization block may detect one or more synchronization words.

As can be appreciated, when the signal bandwidth is less than the available system bandwidth, the band-pass filter 102 fails to filter out the "out of channel" interferers. These are then mixed and can negatively impact system robustness, which results in a higher bit error rate and voice quality degradation.

SUMMARY OF THE INVENTION

These and other problems in the prior art are overcome in large part by a system and method according to the present invention. A programmable band-pass filter is provided in a radio-frequency receiver. The band-pass filter has a bandwidth substantially covering only a channel bandwidth. Once the appropriate channel in use is determined, the frequency band of the band-width filter is set to correspond to it.

The receiver may be used in direct sequence or frequency hopping spread spectrum cordless telephone systems. One such frequency hopping system includes a base station and one or more handsets. The handsets lock onto the base station to synchronize with the frequency hopping scheme. The receivers in the base station and the handsets set their band-pass filter bandwidths according to the frequency of the frequency hopping scheme.

According to one implementation of the invention, a channel selector of a base station selects a frequency according to a frequency hopping scheme. The channel selector provides the frequency to the base station's receiver for the channel band-pass filter. The base station provides control data to the handsets' channel selectors, which lock to the frequencies being hopped-to by the base station. The handsets' channel selectors then provide this information to the bandpass filters of their receivers, which then filter the band of the frequency chosen.

BRIEF DESCRIPTION OF THE DRAWINGS

A better understanding of the invention is obtained when the following detailed description is considered in conjunction with the following drawings in which:

FIG. 3 is a diagram illustrating exemplary badnwidth selection;

FIG. 7 is a flowchart illustrating operation of an implementation of the invention.

DETAILED DESCRIPTION OF THE INVENTION

FIGS. 2–7 illustrate a telecommunications system including telecommunications devices according to an implementation of the present invention.

Figure 1:
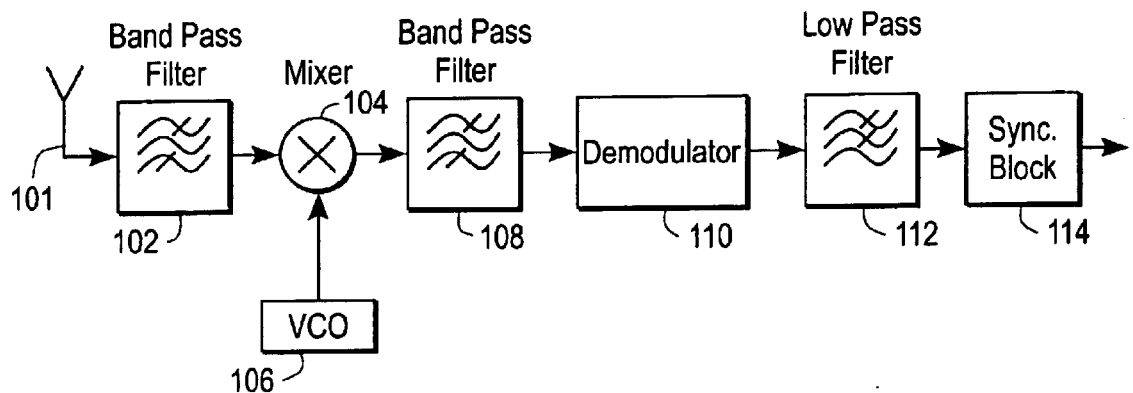
FIG. 1 is a diagram illustrating a radiofrequency receiver according to the prior art.
Figure 2:
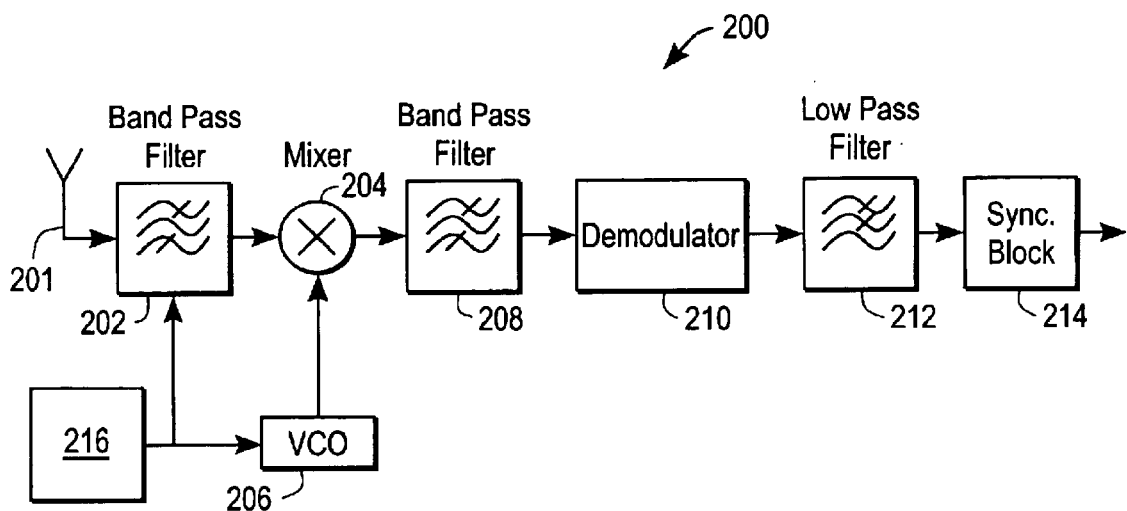
FIG. 2 is a block diagram of an exemplary radiofrequency receiver according to an implementation of the present invention.

FIG. 2 is a diagram of an exemplary receiver in accordance with an implementation of the present invention. The receiver 200 includes an antenna 201, a band-pass filter 202, a mixer 204, a voltage-controlled oscillator 206, a band-pass filter 208, a demodulator 210, a low-pass filter 212, and a synchronization block 214. As will be explained in greater detail below, both the VCO 206 and the band-pass filter 202 receive frequency select inputs 216, defining the frequency and frequency band that is to be used. The band-pass filter 202 then adjusts the band for band pass filtering accordingly.

A modulated signal is received at the antenna 201 and is band-pass filtered by the band-pass filter 202. The band-pass filter 202 reduces the receiving signal bandwidth to the bandwidth that covers substantially only the channel currently in use, responsive to the frequency select signal. By doing so, the band-pass filter 202 filters out the out-of-band interference. The frequency select signal is provided from a processor 216 which determines the channel in use, by any of a variety of methods.

The signal output from the band-pass filter 202 is mixed in the mixer 204 with a lower constant frequency signal which may be generated, as shown, by the voltage controlled oscillator 206. The modulated receive signal is thus transferred down to the Intermediate Frequency (IF). Again, a second band-pass filter 208 is provided behind the mixer 204 because the output of the mixer 204 is two down-converted modulated receive signals on two different frequencies, only one of which can be used in the demodulator 210. Thus, only one of the down-converted IF signals is passed through the bandpass filter 208 to the demodulator 210. The demodulator 210 converts the frequency-modulated signal into a baseband signal, which is low-pass filtered using the low-pass filter 212. Finally, the sync block 214 synchronizes to the low-pass filtered signal.

Operation of the programmable band-pass filter is illustrated more particularly in FIG. 3. Shown are an available frequency band fb, subdivided into a plurality of channels fc1–fc7. It is noted that, in practice, a substantially larger number of channels are available. Thus, FIG. 3 is exemplary only. As will be described in greater detail below, communication occurs over one of the channels fc1–fc7. As described above, the bandwidth of the band-pass filter 208 (FIG. 2) is set to one of the channel bandwidths fc1–fc7, once it is determined which channel is in use.

Figure 4:
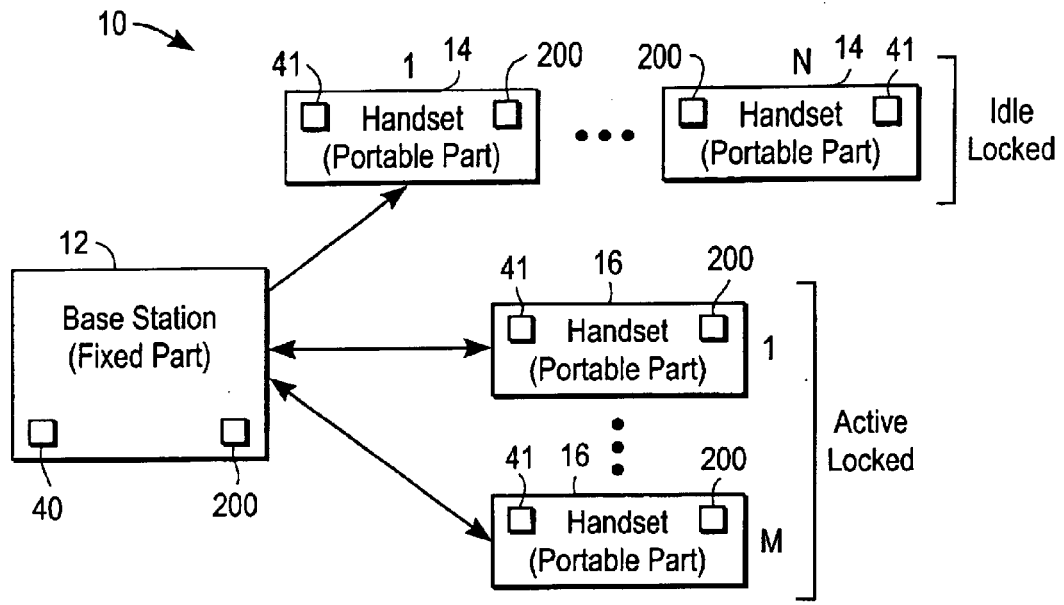
FIG. 4 is a diagram of an exemplary frequency hopping cordless telephone system according to an implementation of the invention.

The receiver 200 of FIG. 2 is suitable for use in any radio-frequency system. FIG. 4 is a block diagram of one implementation of an exemplary radio-frequency system according to the present invention. In particular, the system may be implemented as a frequency hopping cordless telephone system, indicated generally as 10. System 10 includes one or more base stations 12, each of which can also be referred to as a fixed part (FP). Each base station 12 can support communication with a plurality of handsets 14 and handsets 16 using radio frequencies. The interface between base station 12 and handsets 14 and 16 can be referred to as the air interface. Handsets 14 and handsets 16 can also be referred to as portable parts (PP). The base station 12 and the handsets 14 and 16 further include receivers 200 according to the present invention as well as channel selectors 40, 41, as will be described in greater detail below. An exemplary system suitable for use with a receiver according to the present invention is the Gigaset system, available from Siemens Corp.

In operation, base station 12 can support a defined total number of handsets 14 and 16. For example, in one implementation, base station 12 can support a total of eight handsets, either idle locked or active locked. Of the total number of handsets, a given number "M" can be active locked handsets 16. For example, base station 12 could support up to four active locked handsets 16 from the eight total handsets. Of the remaining handsets, base station 12 can support a given number "N" of idle locked handsets 14. For example, "N" can be less than or equal to the difference between the total number of supported handsets (e.g., 8) and the number "M" of active locked handsets 16 (e.g., 0–4). Idle locked handsets 14 are handsets that are currently inactive but are in contact with and in sync with base station 12.

Base station 12 can communicate with handsets 14 and handsets 16 using a time division multiplexed (TDM) frame-based communication protocol. For example, each frame can be ten milliseconds (10 ms) in duration and can include transmit and receive channels for communication and control data. One protocol used with digital cordless telephone systems is the Digital Enhanced Cordless Telecommunications (DECT) protocol, which is the pan-European standard for digital cordless systems and supports up to six locked handsets 16 (i.e., M=6). There are, of course, other protocols used for communicating across the air interface between base station 12 and handsets 14 and handsets 16. For example, the DECT protocol can be modified to support up to four locked handsets 16 (i.e., M=4), each with enhanced communication features due to higher data rates.

In the implementation of FIG. 4, system 10 uses an ISM band of radio frequencies for supporting communication between base station 12 and handsets 14 and 16. For example, system 10 can use the ISM band extending from 2.4 GHz to 2.4835 GHz. An advantage of using the ISM band is that it is unlicensed and does not require a license fee for use. However, in order to operate within FCC or other government regulations, system 10 implements a frequency hopping scheme. This allows system 10 to support robust cordless communications in the ISM band while operating within regulation guidelines. Under the frequency hopping scheme, base station 12 and handsets 14 and 16 move in the time domain from frequency to frequency. Because of the changing frequency, handsets are initially in an unlocked state when entering an area serviced by base station 12. Unlocked handsets can then "listen" at a specific radio frequency to attempt to lock on to base station 12. When base station 12 hops to that frequency specific frequency, unlocked handsets can identify and receive control data transmitted by base station 12. This allows unlocked handsets to lock with base station 12 and sync with the frequency hopping scheme. As will be described in greater detail below, the control data used to synchronize to the frequency are also used to synchronize the band-pass filter.

Figure 5:
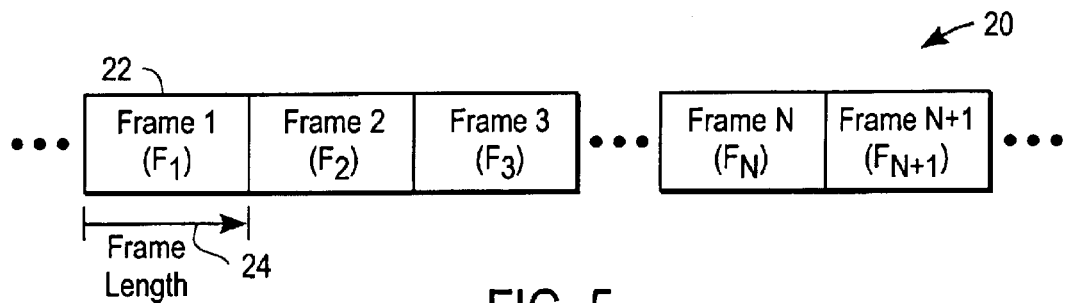
FIG. 5 is a diagram of exemplary frame frequencies for a frequency hopping cordless telephone system according to an implementation of the invention.

FIG. 5 is a block diagram of one embodiment of frame frequencies for a frequency hopping cordless telephone system. As shown, a frame structure, indicated generally at 20, comprises a plurality of frames 22 each having a frame length 24. Each frame 22 follows immediately after the previous frame 22 in the time domain. In the embodiment of FIG. 4, a different frequency ($F_1, F_2, F_3 \ldots F_N, F_{N+1}, \ldots$) is associated with each frame 22 and is used during that frame 22 for communication across the air interface between base station 12 and handsets 14 and 16. This change from frequency to frequency is handled by the frequency hopping scheme implemented by base station 12 and handsets 14 and 16. During the duration of a given frame 22, base station 12 and handsets 14 and 16 communicate using the selected frequency for that frame 22. When the next frame 22 begins, base station 12 and handsets 14 and 16 communicate using a new selected frequency. In one embodiment, frame length 24 is ten milliseconds. Thus, the frequency being used changes every ten milliseconds, as does the frequency band of the band-pass filter 202.

Figure 6:
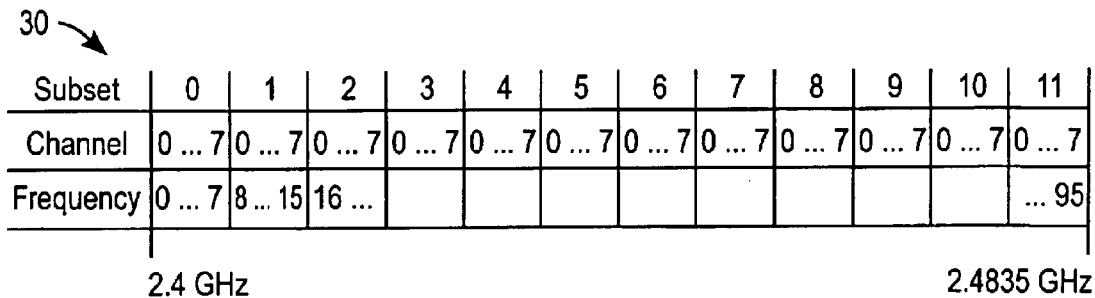
FIG. 6 is a diagram illustrating exemplary subdividing a frequency band according to an implementation of the invention.

FIG. 6 is a diagram of one embodiment of subdividing the ISM band for a frequency hopping cordless telephone system. The ISM band used in this embodiment extends from 2.4 GHz to 2.4835 GHz. As mentioned, the FCC defines requirements for use of frequencies within the ISM band. For example, within a 30 second period, the regulations limit the maximum length of time that a system can use one frequency to 0.4 seconds. Thus, the total available frequencies needs to include seventy-five or more frequencies. In the embodiment of FIG. 6, this range is divided into twelve subsets 30, and each subset 30 is divided into eight channels 32. Each channel 32 is then associated with one of ninety-six frequencies 34 defined within and equally subdividing the ISM band. Frequencies 34 then provide a set of frequencies from which the frequency hopping scheme can select for each frame 22.

The frequency hopping scheme, in addition to selecting frequencies, also needs to implement a scheme for avoiding bad frequencies. For example, a PCS microwave tower may interfere with frequencies in the ISM band in a particular region. Thus, cordless telephone system 10 would not want to use those frequencies. One way to avoid such bad frequencies is to block their selection. By dividing the ISM band into ninety-six frequencies, the embodiment of FIG. 6 provides sufficient frequencies to allow bad frequencies to be blocked while keeping the number of available frequencies above the seventy-five frequency threshold. For example, there is freedom to avoid using the frequencies within two subsets 30 without dropping below the seventy-five frequency threshold.

The channel selector 40 of the base station 10 may implement a frequency hopping selection system that selects a frequency for communication between a base station 12 and one or more handsets 16. A similar selection system 41 resides in handset 16. Selection systems 40 and 41 must be operable to select the same frequency for a given frame, such that base station 12 and handset 16 can continue communication while hopping frequencies. The channel selectors 40, 41 may implement any of a variety of frequency hopping schemes. One such scheme is described in U.S. patent application Ser. No. 09/113,539, filed Jul. 10, 1998, titled "Method and System for Table Implemented Frequency Selection in a Frequency Hopping Cordless Telephone System," which is hereby incorporated by reference in its entirety as if fully set forth herein.

According to one implementation of the invention, the channel selector 40 selects a frequency according to a frequency hopping scheme. The channel selector 40 provides the frequency to the receiver 200 for the band-pass filter 202. The base station provides control data to the handsets' channel selectors 41, which lock to the frequencies being hopped-to by the base station 10. The channel selectors 41 then provide this information to the bandpass filters of their receivers 200, which then filter the band of the frequency chosen. The channel selectors 40, 41 may be implemented as one or more processors or integrated circuits 216 (FIG. 2).

This is illustrated more particularly with reference to the flowchart of FIG. 7. In a step 702, the base station 10's channel selector 40 implements a frequency hopping scheme, and selects frequencies for use during the communication. For example, the channel selector 40 may first select particular frequency subsets (FIG. 4) and then individual channels in each subset. In a step 704, the base station provides the sequence, or the particular frequency, as a frequency select signal to the band pass filter 202. The band pass filter 202 then selects that channel for filtering, in a step 706. In a step 708, the base station provides control signaling to the handset(s), which then lock to the frequency hopping scheme, in a step 710. For example, the handset may listen on a particular frequency. When the base station transmits data on that frequency, the handset detects it and can lock to the frequency hopping scheme. In a step 712, the handset's channel selector 41 provides the frequency (or hop scheme) to the bandpass filer of its receiver. In a step 714, the band pass filter's band is adjusted to the currently selected channel.

The invention described in the above detailed description is not intended to be limited to the specific form set forth herein, but is intended to cover such alternatives, modifications and equivalents as can reasonably be included within the spirit and scope of the appended claims.

What is claimed is:

1. A telecommunications device, comprising:
   a receiver adapted to receive signals at a plurality of channels within one or more frequency bands; and
   a programmable filter adapted to bandpass filter said signals at individual ones of said channels, said receiver being a frequency hopping receiver and said programmable filter receiving a frequency select signal, said programmable filter adapted to select a channel for filtering responsive to said frequency select signal, said bandpass filter having a bandwidth sized to correspond to a channel bandwidth;
   wherein said frequency bands are divided into a plurality of subsets, each subset having a plurality of channels, and said frequency select signal indicates which channel in a particular subset is selected; and
   wherein a total number of frequencies are chosen to allow for avoiding interfering frequencies.

2. A telecommunications device, comprising:
   a receiver adapted to select one of a plurality of frequency channels; and
   a bandpass filter having a variable band corresponding to said one of said plurality of frequency channels, said receiver being a frequency hopping receiver and said bandpass filter receiving a frequency select signal, said bandpass filter adapted to select a channel for filtering responsive to said frequency select signal, said bandpass filter having a bandwidth sized to correspond to a channel bandwidth;
   wherein said frequency channels are selected from a plurality of frequency bands divided into a plurality of subsets, each subset having a plurality of channels, and said frequency select signal indicates which channel in a particular subset is selected wherein a total number of frequencies are chosen to allow for avoiding interfering frequencies.

3. A telecommunications system, comprising:
   a base station; and
   a plurality of handsets;
   wherein each of said base station and handsets has a radio-frequency receiver adapted to receive signals at a plurality of channels within frequency bands and a programmable filter adapted to bandpass filter said signals at individual ones of said channels, said filter having a bandwidth sized to correspond to a channel bandwidth;
   wherein said frequency bands are divided into a plurality of subsets, each subset having a plurality of channels, and said frequency select signal indicates which channel in a particular subset is selected wherein a total number of frequencies are chosen to allow for avoiding interfering frequencies.

4. A telecommunications system in accordance with claim 3, said receiver being a frequency hopping receiver and said programmable filter receiving a frequency select signal.

5. A telecommunications method, comprising:
   receiving a channel of a plurality of channels within a frequency band; and
   band-pass filtering said channel at an input to a radio-frequency receiver, said bandpass filtering comprising filtering with a bandwidth sized to correspond to a channel bandwidth;
   wherein said frequency channels are selected from a plurality of frequency bands divided into a plurality of subsets, each subset having a plurality of channels, and said frequency select signal indicates which channel in a particular subset is selected wherein a total number of frequencies are chosen to allow for avoiding interfering frequencies.

6. A telecommunications method in accordance with claim 5, further comprising hopping from one channel to another channel, detecting said hopping, and band-pass filtering said another channel.

7. A telecommunications method, comprising:

providing a receiver adapted to select one of a plurality of frequency channels within a frequency band; and providing a bandpass filter having a variable band corresponding to said one of said plurality of frequency channels, said bandpass filter having a bandwidth sized to correspond to a channel bandwidth;

wherein said frequency channels are selected from a plurality of frequency bands divided into a plurality of subsets, each subset having a plurality of channels, and said frequency select signal indicates which channel in a particular subset is selected wherein a total number of frequencies are chosen to allow for avoiding interfering frequencies.

8. A telecommunications method in accordance with claim 7, said providing a receiver adapted to select one of plurality of frequency channels comprising providing a frequency hopping receiver.

9. A telecommunications method comprising:

a base station establishing a frequency hopping scheme;

said base station providing information indicative of said scheme to a band pass filter; and said band pass filter filtering channels at frequencies of said frequency hopping scheme responsive to said information, wherein a bandwidth of said band pass filter is sized to correspond to a channel bandwidth;

wherein said frequency channels are selected from a plurality of frequency bands divided into a plurality of subsets, each subset having a plurality of channels, and said frequency select signal indicates which channel in a particular subset is selected wherein a total number of frequencies are chosen to allow for avoiding interfering frequencies.

10. A telecommunications method in accordance with claim 9, further comprising:

said base station providing information indicative of said scheme to at least one portable unit.

11. A telecommunications method in accordance with claim 10, further comprising:

said portable unit providing information indicative of said scheme to a band pass filter.

12. A telecommunications method in accordance with claim 11, further comprising:

said band pass filter filtering channels at frequencies of said frequency hopping scheme responsive to said information.

13. A telecommunications system, comprising:

a base station adapted to establish a frequency hopping scheme and provide information indicative of said scheme to a band pass filter;

wherein said band pass filter is adapted to filter channels at frequencies of said frequency hopping scheme responsive to said information, wherein a bandwidth of said band pass filter is sized to correspond to a channel bandwidth;

wherein said frequency channels are selected from a plurality of frequency bands divided into a plurality of subsets, each subset having a plurality of channels, and said frequency select signal indicates which channel in a particular subset is selected wherein a total number of frequencies are chosen to allow for avoiding interfering frequencies.

14. A telecommunications system in accordance with claim 13, said base station adapted to provide information indicative of said scheme to at least one portable unit.

15. A telecommunications system in accordance with claim 14, said portable unit adapted to provide information indicative of said scheme to a band pass filter.

16. A telecommunications system in accordance with claim 15, said band pass filter adapted to filter channels at frequencies of said frequency hopping scheme responsive to said information.

* * * * *